US009857197B2

(12) United States Patent
Hetland

(10) Patent No.: US 9,857,197 B2
(45) Date of Patent: Jan. 2, 2018

(54) LINEAR ROUTE CONDITION INTERFACE

(71) Applicant: INRIX Inc., Kirkland, WA (US)

(72) Inventor: Michael Scott Jensen Hetland, Seattle, WA (US)

(73) Assignee: INRIX, Inc., Kirkland, WA (US)

( * ) Notice: Subject to any disclaimer, the term of this patent is extended or adjusted under 35 U.S.C. 154(b) by 78 days.

(21) Appl. No.: 14/931,074

(22) Filed: Nov. 3, 2015

(65) Prior Publication Data

US 2017/0122767 A1    May 4, 2017

(51) Int. Cl.
*G01C 21/36* (2006.01)
*G01C 21/20* (2006.01)
*B60Q 9/00* (2006.01)
*G06F 3/0481* (2013.01)

(52) U.S. Cl.
CPC .......... *G01C 21/3694* (2013.01); *B60Q 9/00* (2013.01); *G01C 21/20* (2013.01); *G01C 21/367* (2013.01); *G01C 21/3691* (2013.01); *G01C 21/3697* (2013.01); *G06F 3/04812* (2013.01); *G01C 21/3652* (2013.01)

(58) Field of Classification Search
CPC .. G01C 21/3694; G01C 21/20; G01C 21/367; G01C 21/3697; G01C 21/3691; G01C 21/3652; B60Q 9/00; G06F 3/04812
See application file for complete search history.

(56) References Cited

U.S. PATENT DOCUMENTS

| 2007/0225902 | A1  | 9/2007  | Gretton et al. |             |
|--------------|-----|---------|----------------|-------------|
| 2009/0177373 | A1* | 7/2009  | Groenhuijzen   | G01C 21/36  |
|              |     |         |                | 701/117     |
| 2011/0208417 | A1* | 8/2011  | Fink           | G01C 21/3676|
|              |     |         |                | 701/532     |
| 2011/0313654 | A1* | 12/2011 | Olson          | G01C 21/3415|
|              |     |         |                | 701/516     |
| 2015/0247737 | A1  | 9/2015  | van Dok et al. |             |

FOREIGN PATENT DOCUMENTS

| EP | 2341318 A2 | 7/2011 |
| JP | 2003148972 A | 5/2003 |
| JP | 2005010118 A | 1/2005 |

OTHER PUBLICATIONS

Int. Search Report/Written Opinion cited in PCT Application No. PCT/US2016/060221 dated Feb. 2, 2017, 15 pgs.

* cited by examiner

*Primary Examiner* — Russell Frejd
(74) *Attorney, Agent, or Firm* — Cooper Legal Group, LLC

(57) ABSTRACT

Among other things, one or more client devices, techniques, and/or systems are provided for providing linear route conditions. A linear route condition interface, presented to a user, may comprise a linear route representation (e.g., represented by a horizontal or vertical bar) of a route from a starting location to a destination location. The linear route representation depicts a first road segment, populated with a traffic flow indicator, a second road segment, populated with a second traffic flow indicator, and/or any other number of road segments between the starting location and the destination location. Responsive to identifying user indication of interest for the first road segment, supplementary information about traffic conditions on the first road segment are presented to the user. Responsive to identifying user indication of interest for the second road segment, supplementary information about traffic conditions on the second road segment are presented to the user.

20 Claims, 10 Drawing Sheets

LINEAR ROUTE CONDITION INTERFACE

BACKGROUND

Users may utilize one or more devices to obtain route information. For example, a user may utilize a vehicle navigation unit with global positioning system (GPS) capabilities to obtain driving directions to a local airport. In another example, the user may utilize a smart phone to obtain walking directions for a route to a restaurant. The user may desire to obtain information about the route, such as an arrival time to a destination, congestion, and/or incidents (e.g., construction and accidents) along the route. Many map applications may overwhelm the user with unnecessary information, which may become problematic such as for drivers with limited attention capabilities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more client devices, systems, and/or techniques for providing linear route conditions are provided herein. In one aspect, a linear route condition interface may be displayed to a user through a client device (e.g., through a vehicle navigation device, a smart device, a wearable device, smart glasses, a smart watch, etc.). The linear route condition interface may comprise a linear route representation of a route from a starting location (e.g., a home of the user) to a destination location (e.g., a work building of the user). In an example, the linear route representation may be configured according to a linear shape, such as a bar (e.g., a vertical bar or horizontal bar), used to convey conditions between a current location of the user and the destination location, which may decrease the amount of unnecessary information, otherwise conveyed by a map, that could have distracted or overwhelm the user. In an example, the linear route representation may be formatted according to a linear non-map configuration.

The linear route representation may depict a first road segment (e.g., a segment of a highway that the user may traverse along the route), a second road segment (e.g., a segment of a downtown street that the user may traverse along the route), and/or any other number of road segments between the starting location and the destination location. In an example, the first road segment may be scaled to correspond to a first distance that the first road segment is traversed along the route and the second road segment may be scaled to correspond to a second distance that the second road segment is traversed along the route.

The linear route condition interface may be populated with a traffic flow indicator for the first road segment and a second traffic flow indicator for the second road segment. In an example, the first road segment may be presented in a color indicative of a congestion level relative to a threshold (e.g., the first road segment may be colored red responsive to the congestion being over the threshold). The second road segment may be presented in a second color indicative of a second congestion level relative to the threshold (e.g., the second road segment may be colored yellow responsive to the congestion being below the threshold).

Responsive to identifying a user indication of interest for the first road segment (e.g., a point of contact, such as a touch gesture, corresponding to the first road segment, a voice command corresponding to the first road segment, or ocular focus corresponding to the first road segment), supplementary information about traffic conditions on the first road segment may be presented to the user (e.g., a street name of the first road segment, a duration of a delay, a cause of delay, a volume of truck traffic, a travel time for the route, a travel time of the first road segment, a speed limit of the first road segment, a number of incidents on the first road segment, a volume of vehicles on the first road segment, an event such as a festival, a business, a point of interest, etc.). In an example, responsive to the user indication of interest corresponding to the first road segment, a view of the first road segment may be expanded to an expanded view (e.g., and/or a view of the second road segment may be collapsed to accommodate for the expanded view). In an example, the expanded view may comprise an increased level of granularity for the supplemental information.

In another example, responsive to the user indication of interest corresponding to the first road segment, a first vibration frequency may be presented to the user based upon congestion of the first road segment. In another example, responsive to the user indication of interest corresponding to the second road segment, a second vibration frequency may be presented to the user based upon congestion of the second road segment. In an example, the first vibration frequency may be proportional to the congestion of the first road segment and the second vibration frequency may be proportional to the congestion of the second road segment. For example, if the first road segment has a greater amount of congestion than the second road segment, then the first vibration frequency may be greater than the second vibration frequency.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
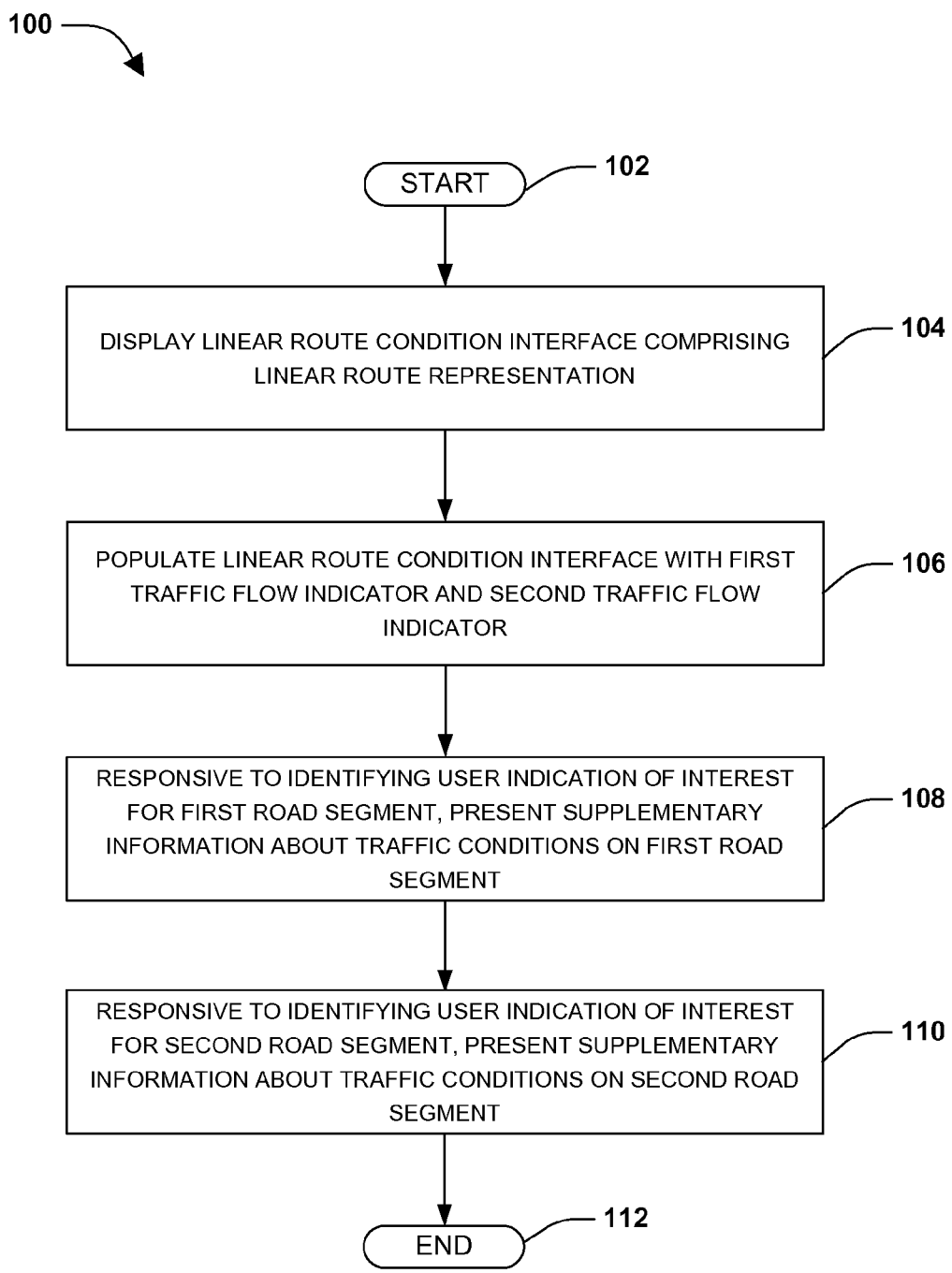
FIG. 1 is an example method for providing linear route conditions.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more client devices, systems, and/or techniques for providing linear route conditions are provided herein. Users may have a desire to view supplementary information about a route that may affect an arrival time to a destination location, such as accidents on a first road segment of the route, construction on a second road segment of the route, traffic congestion on a third road segment of the route, etc. Unfortunately, the supplementary information may be represented pictorially on a map, which may be distracting to the user. For example, the user may be familiar with the route (e.g., the route may comprise the user's typical route to work), and thus the user may merely be interested in conditions that may affect a travel time to the destination location (e.g., a travel time to work). Accordingly, as provided herein, a linear route condition interface, comprising a linear route presentation of a route (e.g., a horizontal bar), may be displayed. The linear route condition interface may be populated with a traffic flow indicator for the first road segment and/or a second traffic flow indicator for the second road segment. Displaying one or more traffic flow indicators, corresponding to one or more road segments, within the linear route representation may provide the user with relevant information about the user's travel time, what road segment the user may desire to avoid, etc., as opposed to overwhelming the user with unnecessary information that may be distracting (e.g., the user may become distracted looking at the map). In this way, driver distraction due to unnecessary information may be reduced.

One embodiment of providing a linear route condition is illustrated by an exemplary method 100 in FIG. 1. At 102, the method 100 starts. At 104, a linear route condition interface comprising a linear route representation (e.g., a horizontal bar, a vertical bar, etc.) depicting a starting location, a destination location, a first road segment of the route, a second route segment of the route, etc., may be displayed to the user. The linear route representation may be formatted according to a linear non-map configuration. In an example, the first road segment may be scaled to correspond to a first distance that the first road segment is traversed along the route and the second road segment may be scaled to correspond to a second distance that the second road segment is traversed along the route. For example, if the first distance comprises 8 miles and the second distance comprises 4 miles, then the first route segment may be depicted as having a first length that is twice a second length of the second route segment.

At 106, the linear route condition interface may be populated with a traffic flow indicator for the first road segment and a second traffic flow indicator for the second road segment. In an example, the first traffic flow indicator may comprise a depiction of the first road segment in a first color (e.g., green) responsive to the first road segment having congestion below a first threshold (e.g., a one minute delay, or some other delay duration). The first traffic flow indicator may comprise a depiction of the first road segment in a second color (e.g., yellow) responsive to the first road segment having congestion between the first threshold and a second threshold (e.g., a four minute delay, or some other delay duration). The first traffic flow indicator may comprise a depiction of the first road segment in a third color (e.g., red) responsive to the first road segment having congestion exceeding the second threshold. In an example, the first road segment may comprise one or more traffic indicators in one or more colors corresponding to congestion levels of portions of the first road segment. In an example, the first road segment may have a first portion having congestion over the second threshold and a second portion having congestion below the first threshold. Accordingly, the first portion may be depicted in the third color (e.g., red), and the second portion may be depicted in the first color (e.g., green). In an example, the second traffic flow indicator may comprise a depiction of the second road segment in the first color responsive to the second road segment having congestion below the first threshold, in the second color responsive to the second road segment having congestion between the first threshold and the second threshold, or in the third color responsive to the second road segment having congestion exceeding the second threshold.

At 108, responsive to identifying a user indication of interest for the first road segment (e.g., a point of contact, such as a touch gesture or ocular focus corresponding to the first road segment, a voice command corresponding to the first road segment, etc.), supplementary information about traffic conditions (e.g., any condition that may affect the driver's commute, such as weather, congestion, accidents, an event partially blocking off the first road segment, etc.) on the first road segment may be presented to the user. In an example, the supplementary information may comprise a street name of the first road segment, a duration of a delay on the first road segment, a cause of the delay (e.g., congestion caused by a traffic accident, construction, weather conditions, etc.), a volume of truck traffic on the first road segment, a travel time for the route, a travel time of the first road segment, a speed limit for the first road segment, a number of incidents on the first road segment, a volume of vehicles on the first road segment, an event, a business, a point of interest, etc. In an example, responsive to the user indication of interest corresponding to the first road segment, a view of the first road segment may be expanded to an expanded view (e.g., the first road segment may be presented in separate bar comprising a zoomed in view; the second road segment may be visually collapsed while the first road segment is in the expanded view; etc.). In an example, the expanded view may comprise an increased level of granularity for the supplemental information (e.g., additional details about the supplemental information).

At 110, responsive to identifying the user indication of interest for the second road segment, supplementary information about traffic conditions on the second road segment may be presented to the user. In an example, the supplementary information may comprise a street name of the second road segment, a duration of a delay on the second road segment, a cause of the delay on the second road segment, a volume of truck traffic on the second road segment, a travel time of the second road segment, a speed limit for the second road segment, a number of incidents on the second road segment, a volume of vehicles on the second road segment, an event, a business, a point of interest, etc. In an example, responsive to the user indication of interest corresponding to the second road segment, a view of the second road segment may be expanded to a second expanded view (e.g., the second road segment may be presented in the separate bar comprising the zoomed in view; the first road segment may be visually collapsed while the second road segment is in the expanded view; etc.).

In an example, responsive to a selection of a road segment having congestion exceeding a congestion threshold, the linear route condition interface may be populated with an alternative linear route representation of an alternative route from a start detour location to the destination location. In an example, the alternative linear route may depict a third road segment. The alternative linear representation may be displayed as a second bar that branches off of the linear route representation. Accordingly, the user may be presented with one or more linear route representations that represent one or more routes to the destination location.

In an example, a current state of the route may be obtained (e.g., such as periodically) and the linear route condition interface may be updated with an updated first traffic flow indicator and an updated second traffic flow indicator based upon the current state. For example, if the linear route condition interface is populated at a first time (e.g., when the user departs for the destination location), then the linear route condition may be updated at a second time (e.g., every 30 seconds after the user departs). The current state of the route at the second time may comprise updated congestion data (e.g., a traffic accident) that may delay the user. In an example, responsive to the route having an updated delay exceeding a delay threshold (e.g., 10 minutes or some other delay duration), the linear route condition interface may be populated with the alternative linear route representation.

In another example, responsive to the user indication of interest corresponding to the first road segment, a first vibration frequency may be provided to the user based upon congestion of the first road segment. In another example, responsive to the user indication of interest corresponding to the second road segment, a second vibration frequency may be provided to the user based upon congestion of the second road segment. In an example, the first vibration frequency may be proportional to the congestion of the first road segment and the second vibration frequency may be proportional to the congestion of the second road segment (e.g., a higher frequency may correspond to a higher level of congestion, and a lower frequency may correspond to a lower level of congestion). At 112, the method 100 ends.

Figure 2A:
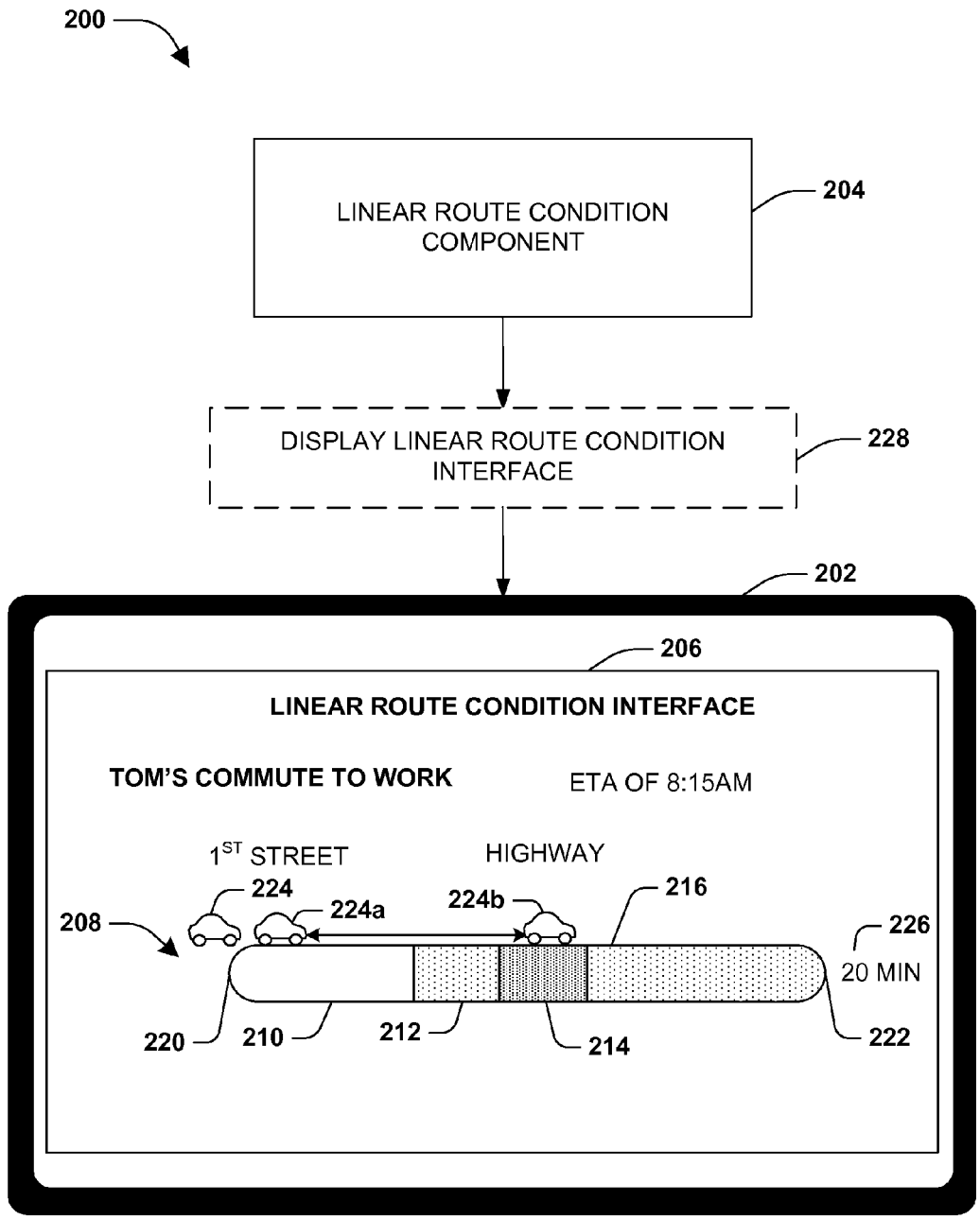
FIG. 2A is a component block diagram illustrating an example system for providing linear route conditions, where a linear route representation is displayed.

FIGS. 2A-2D illustrate examples of a system 200, comprising a linear route condition component 204, for providing a linear route representation 208. FIG. 2A illustrates the linear route condition component 204 associated with a client device 202 of a user, Tom (e.g., a smart watch, smart glasses, a wearable device, a smart phone, a vehicle navigation unit, etc.). The linear route condition component 204 may be configured to display 228 a linear route condition interface 206 on the client device 202. The linear route condition interface 206 may comprise an estimated time of arrival (ETA) at a destination location 222 (e.g., 8:15 AM) for a route (e.g., Tom's commute to work) and/or a travel time 226 (e.g., 20 minutes). The linear route condition representation 208 may comprise a starting location 220, the destination location 222, a first road segment 210, a second road segment 212, a third road segment 214, and/or a fourth road segment 216. The first road segment 210 may comprise a traffic flow indicator comprising a first color (e.g., and/or fill, highlighting, icon, imagery, etc.) based upon the first road segment having congestion below a first threshold. The second road segment 212 may comprise a second traffic flow indicator comprising a second color (e.g., and/or fill, highlighting, icon, imagery, etc.) based upon the second road segment having congestion between the first threshold and a second threshold. The third road segment 214 may comprise a third traffic flow indicator comprising a third color (e.g., and/or fill, highlighting, icon, imagery, etc.) based upon the third road segment having congestion being above the second threshold. The fourth road segment 216 may comprise a fourth traffic flow indicator comprising the second color (e.g., and/or fill, highlighting, icon, imagery, etc.) based upon the fourth road segment having congestion between the first threshold and the second threshold.

In an example, the user may provide a user indication of interest by moving an icon 224 (e.g., a car icon) to a position 224a corresponding to the first road segment 210. In an example, the user may provide the user indication of interest by touching the linear route representation 208 at a point corresponding to a particular road segment. Responsive to the user indication of interest corresponding to the first road segment 210, supplemental information about the first road segment 210 may be presented on the client device 202. The supplemental information may comprise a street name (e.g., $1^{st}$ Street) of the first road segment 210. In an example, the user may provide the user indication of interest by moving the icon 224 to a second position 224b corresponding to the third road segment 214. Responsive to the user indication of interest corresponding to the third road segment 214, second supplemental information about the third road segment 214 may be presented on the client device 202. The second supplemental information may comprise a second street name (e.g., Highway 101) of the third road segment 214. In another example, the user may provide the user indication of interest by generating a voice command (e.g., "tell me about the weather condition on the first road segment") corresponding to the first road segment 210.

Figure 2B:
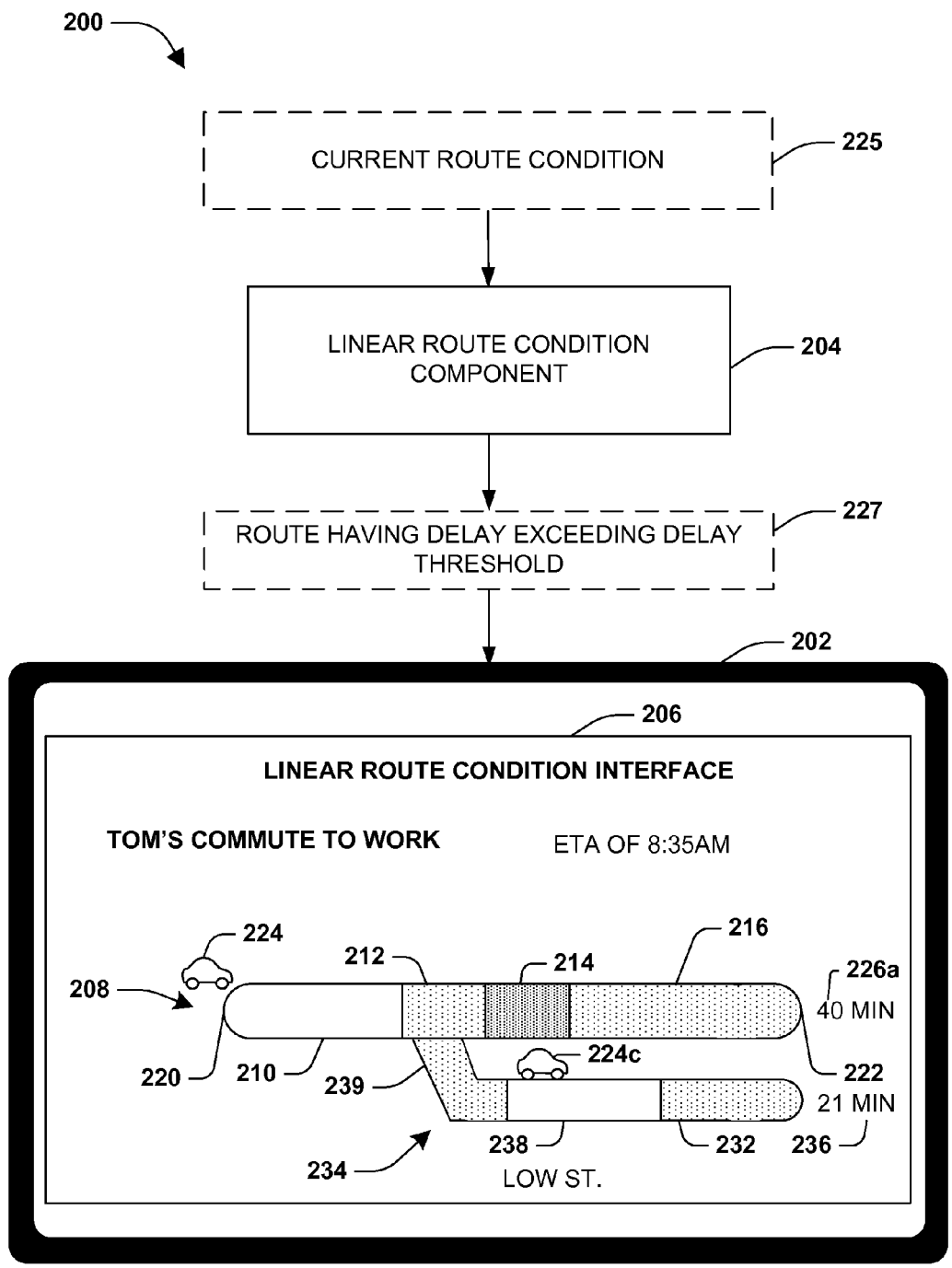
FIG. 2B is a component block diagram illustrating an example system for providing linear route conditions, where a linear route representation and an alternative linear route representation are displayed.

FIG. 2B illustrates the linear route condition component 204 providing an alternative route 234. A current route condition 225 may be identified by the linear route condition component 204. The travel time 226 may be updated to comprise an updated travel time 226a (e.g., 40 min) and/or an updated ETA (e.g., 8:35 AM). Responsive to a delay 227 on the route exceeding a delay threshold (e.g., adding more than 10 minutes to the ETA, or some other duration), the linear route condition component 204 may generate the alternative route 234. The alternative route 234 may comprise a fifth road segment 239, a sixth road segment 238, and/or a seventh road segment 232. An alternative travel time 236 (e.g., 21 minutes) may be presented for the alternative route 234.

The user may provide a user indication of interest in the sixth road segment 238. In an example, the user may provide the user indication of interest by moving the icon 224 to a third position 224c corresponding to the sixth road segment 238. Responsive to the user indication of interest corresponding to the sixth road segment 238, second supplemental information about the sixth road segment 238 may be presented on the client device 202. The second supplemental information may comprise a third street name (e.g., Low St.) of the sixth road segment 238.

Figure 2C:
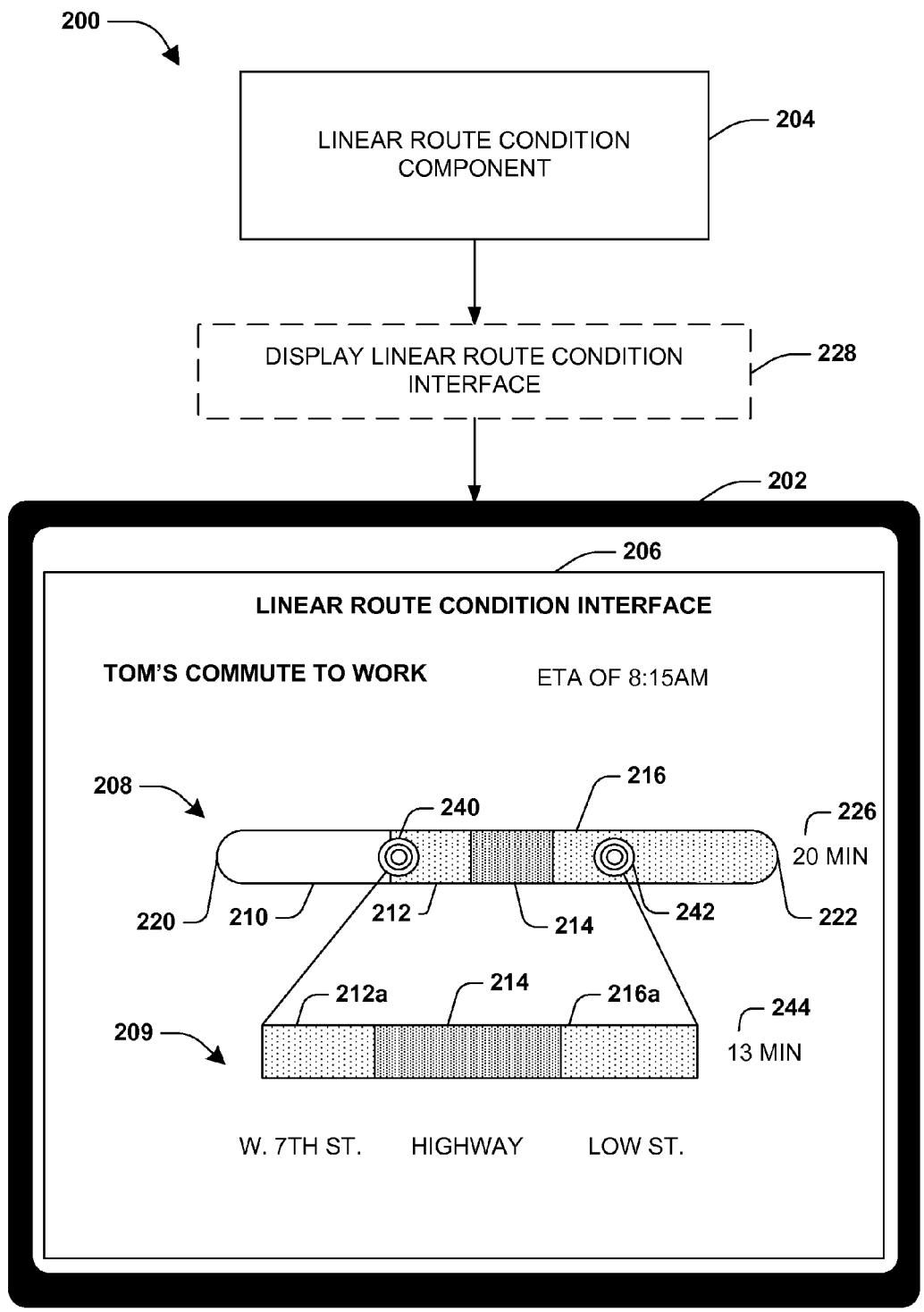
FIG. 2C is a component block diagram illustrating an example system for providing linear route conditions, where a linear route representation is expanded.

FIG. 2C illustrates the linear route condition component 204 providing a second linear route representation 209. Responsive to a first point of contact 240 on a first point on the linear route condition representation 208 and a second point of contact 242 on a second point of the linear route condition representation 208, the second linear route representation 209 may be generated to correspond to a route portion between the first point and the second point. The route portion may comprise a portion 212a of the second road segment 212, the third road segment 214, and a second portion 216a of the fourth road segment 216. A travel time 244 (e.g., 13 min), to travel between the first point and the second point, may be generated and presented to the user. Supplementary information, such as street names of the second road segment 212 (e.g., W. 7$^{th}$ St.), the third road segment 214 (e.g., Highway), and/or the fourth road segment 216 (e.g., Low St.), about the route portion between the first point and the second point may be presented to the user.

Figure 2D:
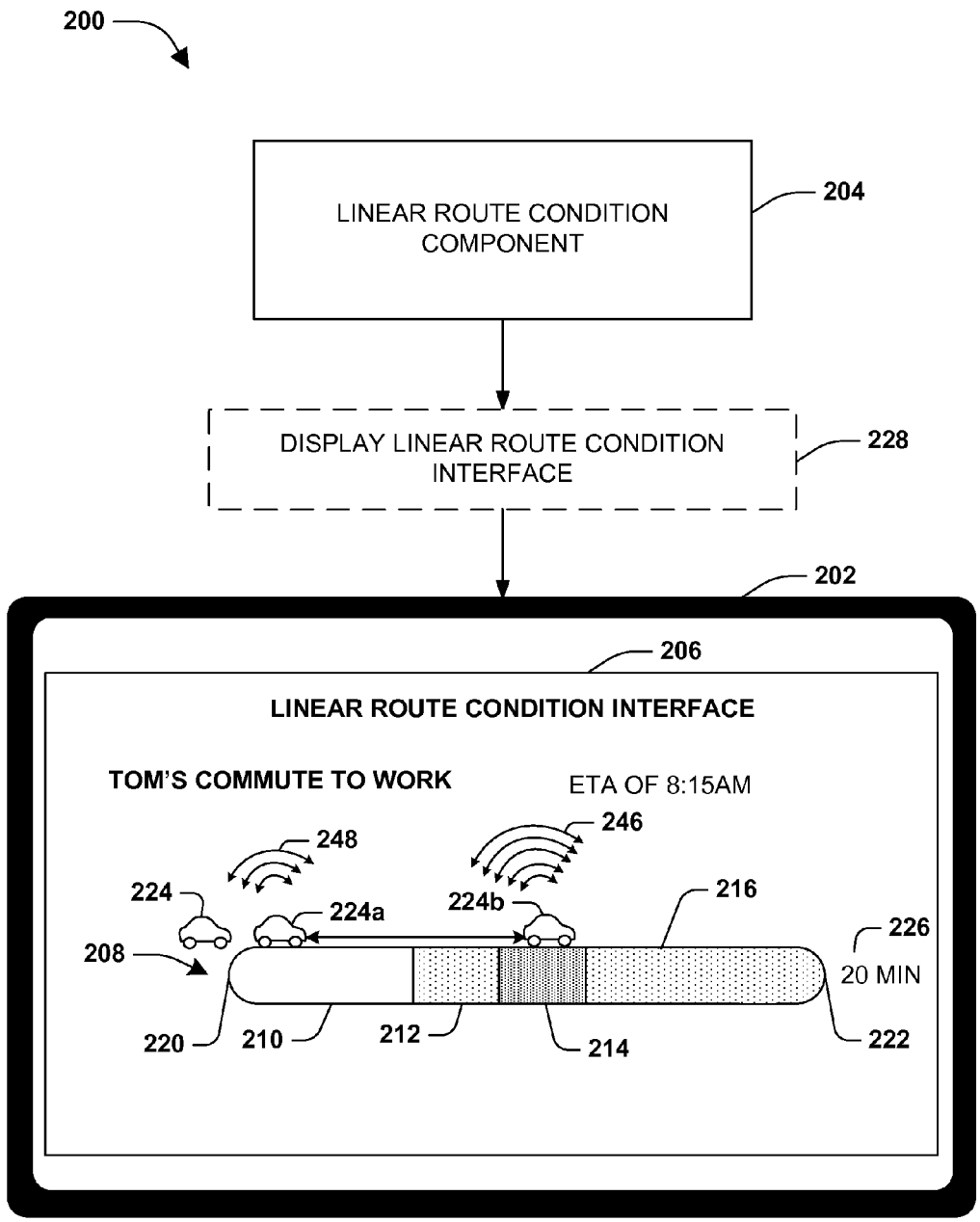
FIG. 2D is a component block diagram illustrating an example system for providing linear route conditions, where a vibration frequency is provided based upon congestion of a first road segment on a linear route representation.

FIG. 2D illustrates the linear route condition component 204 providing the traffic flow indicator to the user utilizing vibrations. In an example, the user may provide a user indication of interest by moving the icon 224 to the position 224a corresponding to the first road segment 210. Responsive to the user indication of interest corresponding to the first road segment 210, the client device 202 may present a first vibration frequency 248 based upon a congestion of the first road segment 210. In an example, the user may provide a user indication of interest by moving the icon 224 to a second position 224b corresponding to the third road segment 214. Responsive to the user indication of interest corresponding to the third road segment 214, the client device 202 may present a second vibration frequency 246 based upon a congestion of the third road segment 214. In an example, a third vibration frequency (not shown), corresponding to a congestion of the second road segment 212, may be provided by the client device 202 based upon the user moving the icon 224 over the second road segment 212. In an example, the first vibration frequency 248 may be proportional to the congestion of the first road segment 210 and the second vibration frequency 246 may be proportional to the congestion of the third road segment 214. In an example, a higher vibration frequency may correspond to a higher level of congestion and a lower vibration frequency may correspond to a lower level of congestion.

Figure 3A:
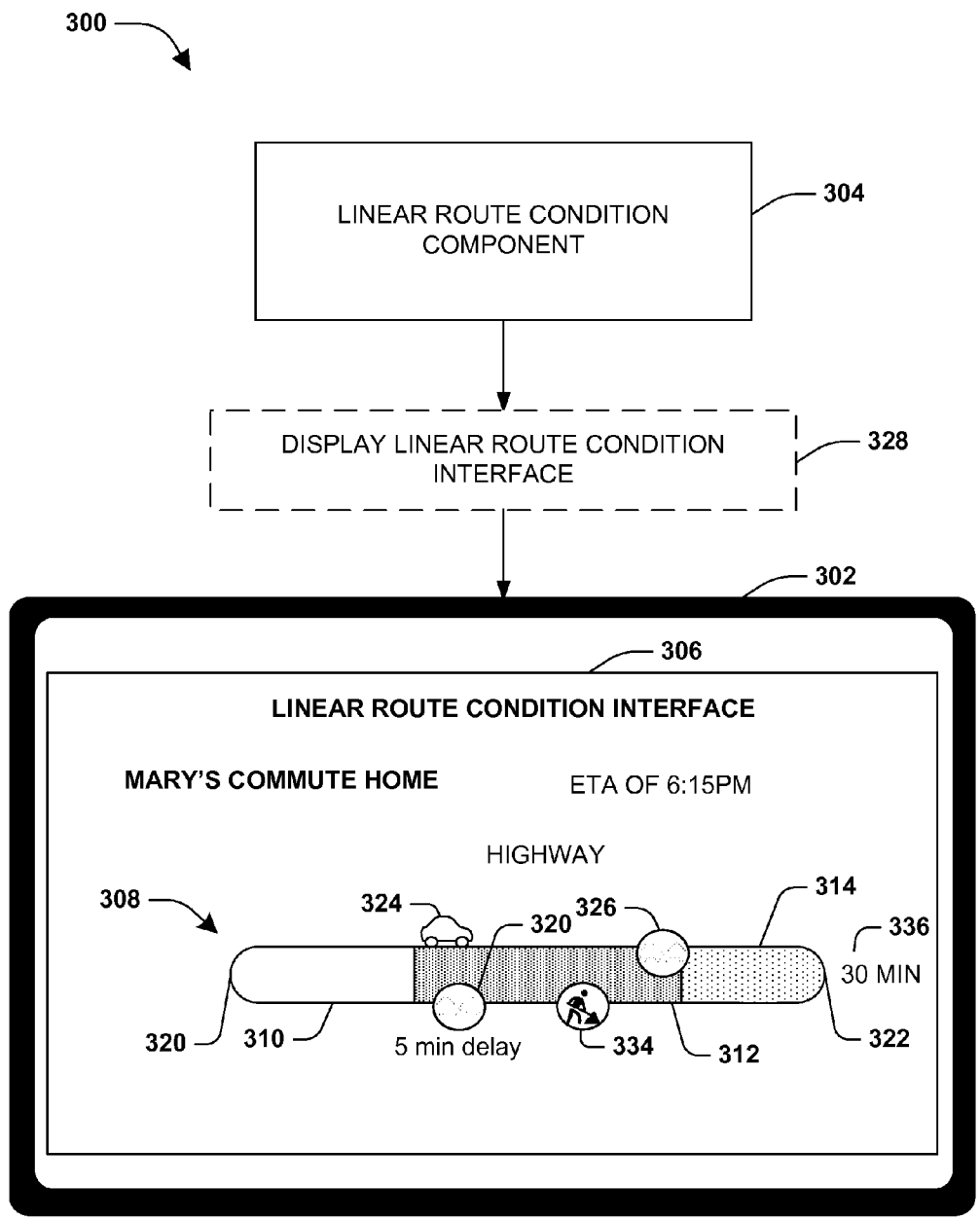
FIG. 3A is a component block diagram illustrating an example system for providing linear route conditions, where supplementary information is displayed on a linear route representation.
Figure 3B:
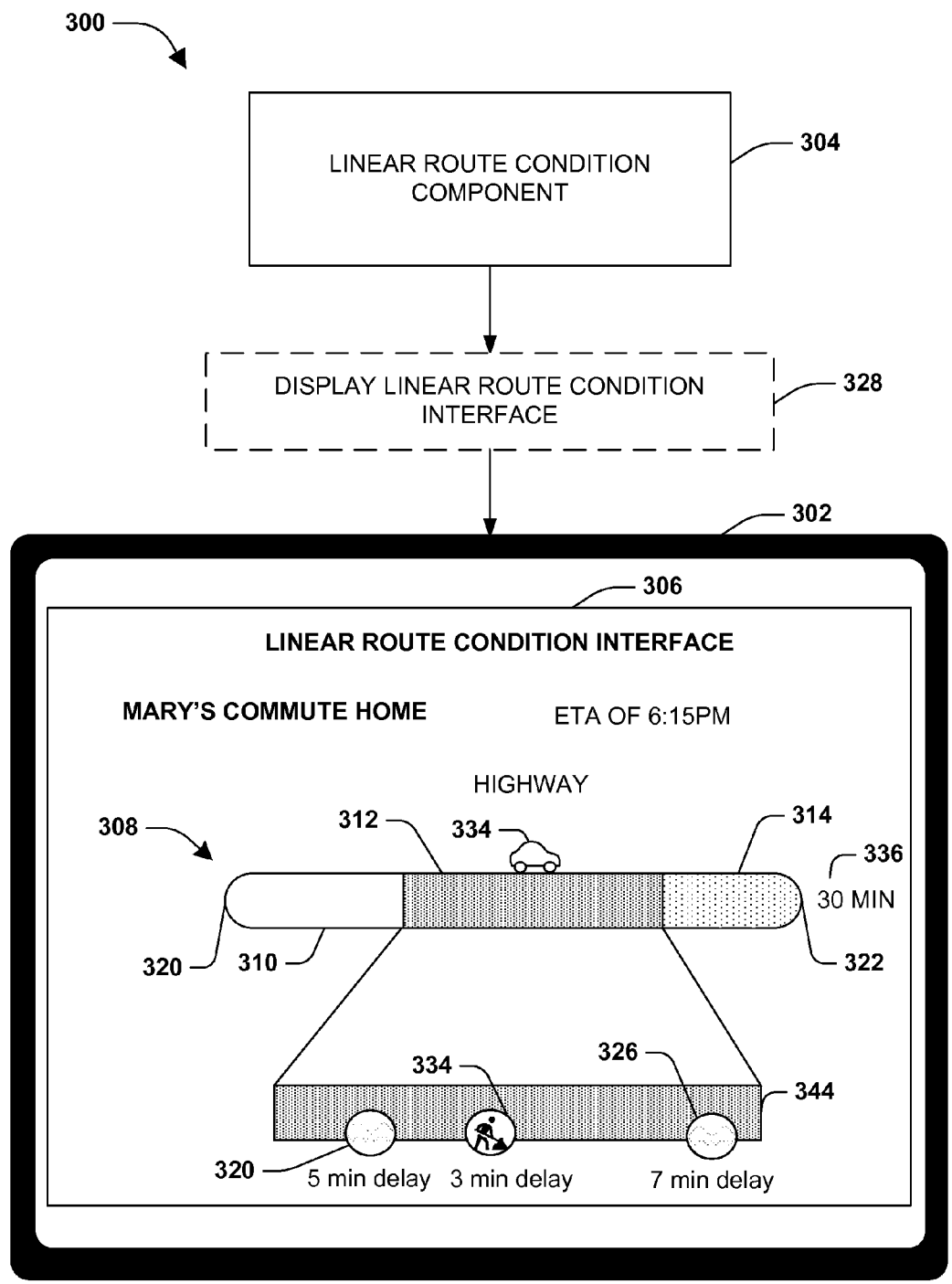
FIG. 3B is a component block diagram illustrating an example system for providing linear route conditions, where a second road segment is expanded.

FIGS. 3A-3B illustrate examples of a system 300, comprising a linear route condition component 304, for providing a linear route representation 308. FIG. 3A illustrates the linear route condition component 304 associated with a client device 302 of a user, Mary. The linear route condition component 304 may be configured to display 328 a linear route condition interface 306 on the client device 302. The linear route condition interface 306 may comprise an estimated time of arrival (ETA) (e.g., 6:15 PM) at a destination location 322 for a route (e.g., Mary's commute home) and/or a travel time 336 (e.g., 30 minutes) to traverse the route. The linear route condition representation 308 may comprise a starting location 320, the destination location 322, a first road segment 310, a second road segment 312, and a third road segment 314. The first road segment 310 may comprise a traffic flow indicator comprising a first color (e.g., and/or fill, highlighting, icon, imagery, etc.) based upon the first road segment 310 having congestion below a first threshold. The second road segment 312 may comprise a second traffic flow indicator comprising a second color (e.g., and/or fill, highlighting, icon, imagery, etc.) based upon the second road segment 312 having congestion above a second threshold. The third road segment 314 may comprise a third traffic flow indicator comprising a third color (e.g., and/or fill, highlighting, icon, imagery, etc.) based upon the third road segment 314 having congestion between the first threshold and the second threshold.

In an example, the user may provide a user indication of interest by moving an icon 324 to a position corresponding to the second road segment 312. Responsive to the user indication of interest corresponding to the second road segment 312, supplemental information about the second road segment 312 may be presented on the client device 302. The supplemental information may comprise a street name (e.g., Highway) of the second road segment 312, a first indicator 320 (e.g., comprising an accident symbol corresponding to an accident along the second road segment 312)) and a corresponding delay (e.g., the accident may cause a 5 minute delay), a second indicator 334 (e.g., comprising a construction symbol corresponding to construction along the second road segment 312), and/or a third indicator (e.g., comprising a second accident symbol corresponding to a second along the second road segment 312). In an example, merely the nearest indicator to the icon 324 may be provided, such as the first indicator 320.

FIG. 3B illustrates the linear route condition component 304 comprising an expanded view 344 of the second road segment 312. For example, responsive to the user providing a user indication of interest for the second road segment 312, the expanded view 344 of the second road segment 312 may be presented to the user. The expanded view 344 may include an increased level of granularity for the supplemental information. In an example, a second delay (e.g., a 3 minute delay) may be displayed corresponding to the construction represented by the second indicator 334, and a third delay (e.g., a 7 minute delay) may be displayed corresponding to the accident represented by the third indicator 326.

Figure 4:
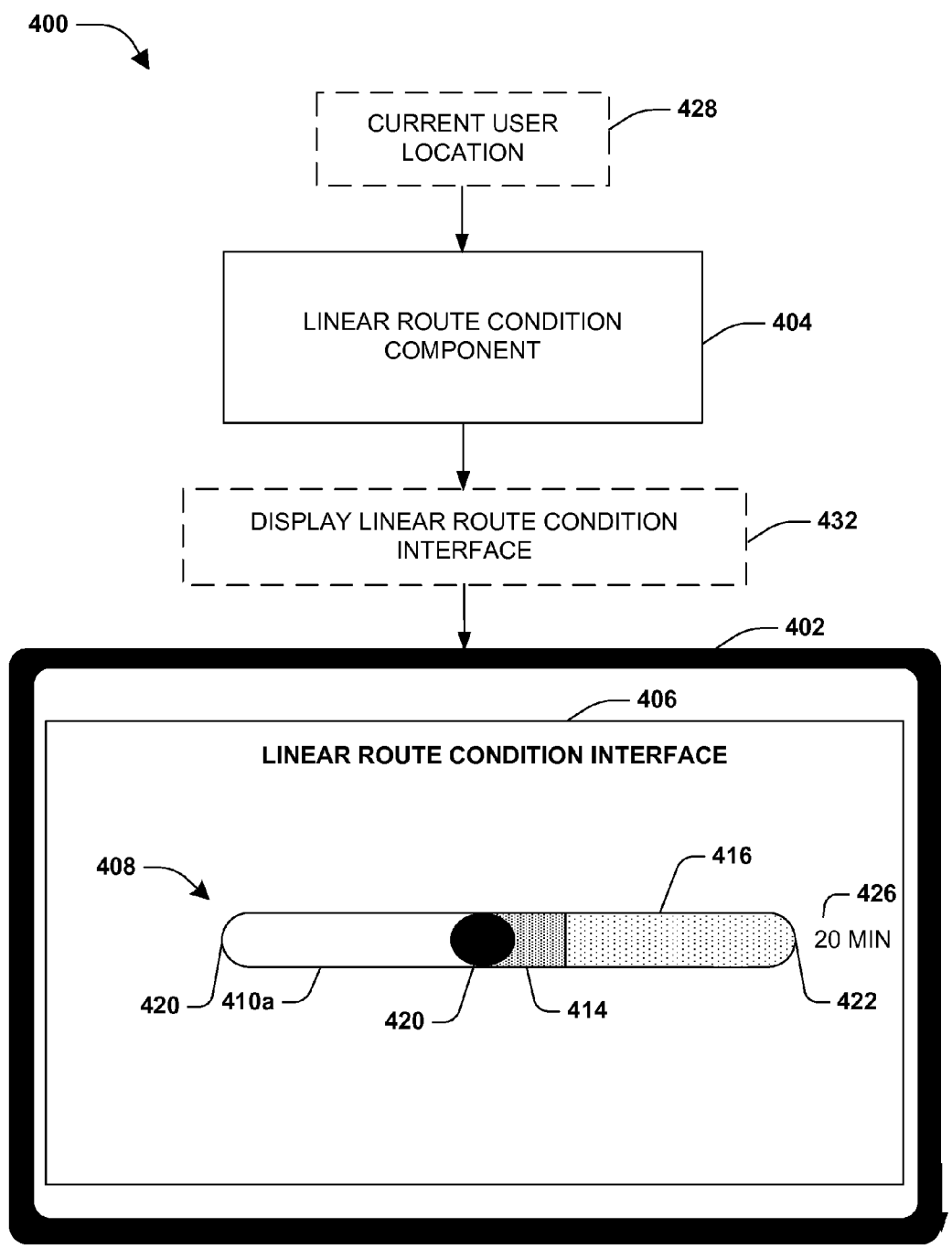
FIG. 4 is a component block diagram illustrating an example system for providing linear route conditions, where a linear route representation is updated with a current user location.

FIG. 4 illustrates examples of a system 400, comprising a linear route condition component 404, for providing linear route conditions. In an example, the linear route condition component 404 may display 432 a linear route condition interface 406, comprising a linear route representation 408 of a route from a starting location 420 to a destination location 422, through a client device 402. The linear route may comprise a first road segment (not shown), a second road segment 414, and/or a third road segment 416. The linear route condition interface 406 may be populated with a progress indicator 420. A display location of the progress indicator 420 may be moved relative to the linear route representation 408 to illustrate a current user location 428. A portion of the route already traveled by the user (e.g., about 50% of the route) may be illustrated as a completed portion 410a of the linear route representation 408 that is displayed "behind" the user indicator 420. The user indicator 420 may be moved to correspond to a progress point on the linear route representation 408. The linear route condition component 404 may update a time remaining 426 until the route is completed based upon the current user location 428.

Figure 5:
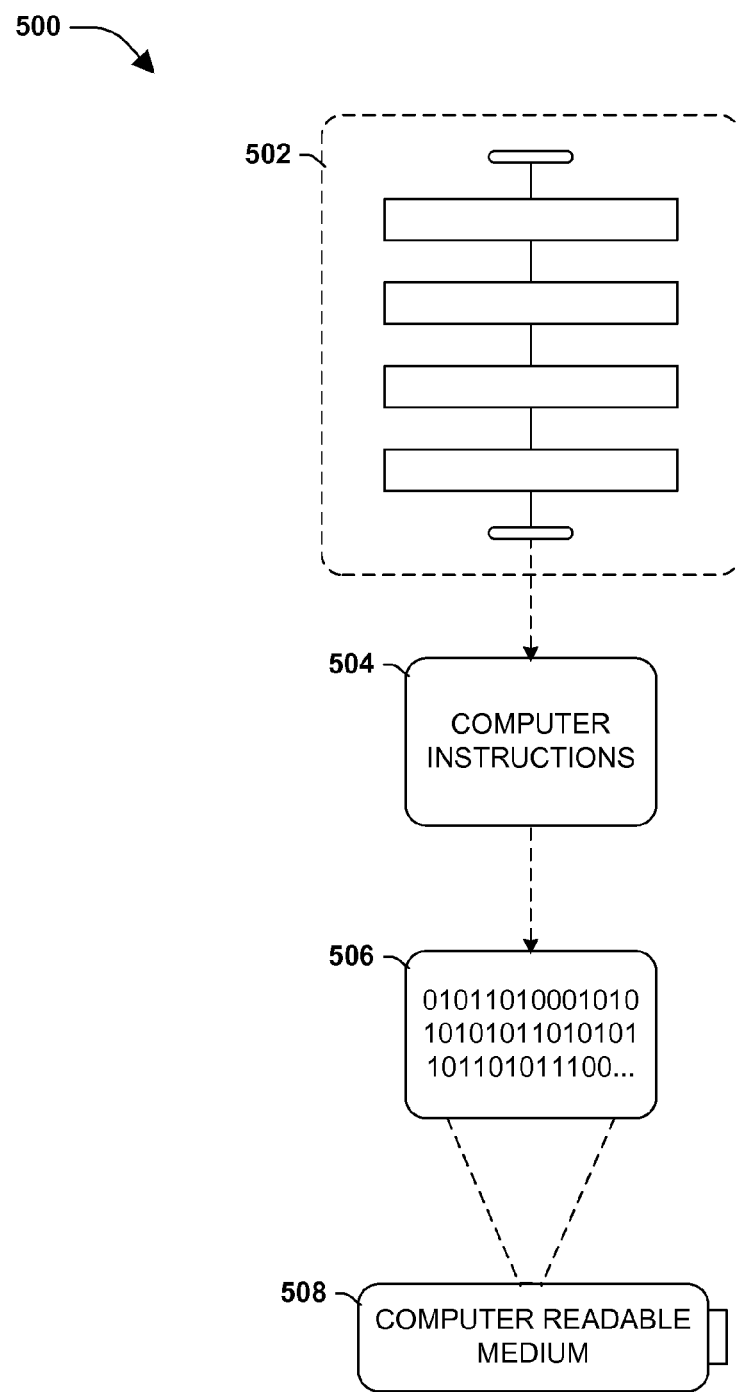
FIG. 5 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to one or more of the principles set forth herein. In one such embodiment 500, the processor-executable computer instructions 506 may be configured to perform a method 510, such as at least some of the exemplary method 100 of FIG. 1, for example. In another such embodiment, the processor-executable instructions 506 may be configured to implement a system, such as at least some of the exemplary system 200 of FIGS. 2A-2D, at least some of the exemplary system 300 of FIGS. 3A-3B, and/or at least some of the exemplary system 400 of FIG. 4, for example. Many such computer-readable media 502 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
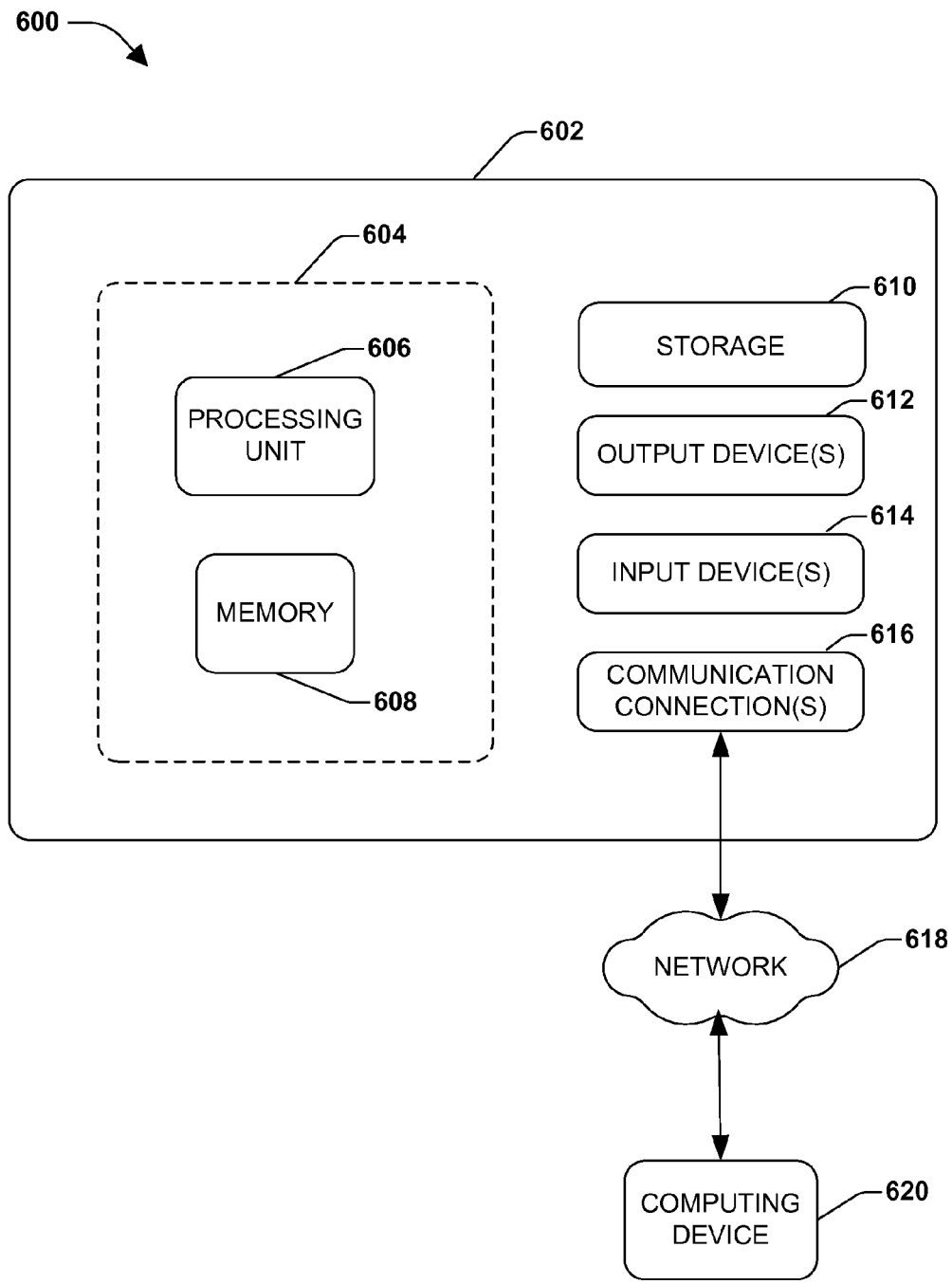
FIG. 6 illustrates an example computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 602 configured to implement one or more embodiments provided herein. In one configuration, computing device 602 includes at least one processing unit 606 and memory 608. Depending on the exact configuration and type of computing device, memory 608 may be volatile (such as RAM, for example), non-volatile (such as ROM, flash memory, etc., for example), or some combination of the two. This configuration is illustrated in FIG. 6 by dashed line 604.

In other embodiments, device 602 may include additional features and/or functionality. For example, device 602 may also include additional storage (e.g., removable and/or non-removable) including, but not limited to, magnetic storage, optical storage, and the like. Such additional storage is illustrated in FIG. 6 by storage 610. In one embodiment, computer readable instructions to implement one or more embodiments provided herein may be in storage 610. Storage 610 may also store other computer readable instructions to implement an operating system, an application program, and the like. Computer readable instructions may be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media may be part of device 602.

Device 602 may also include communication connection(s) 616 that allows device 602 to communicate with other devices. Communication connection(s) 616 may include, but is not limited to, a modem, a Network Interface Card (NIC), an integrated network interface, a radio frequency transmitter/receiver, an infrared port, a USB connection, or other interfaces for connecting computing device 602 to other computing devices. Communication connection(s) 616 may include a wired connection or a wireless connection. Communication connection(s) 616 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 602 may include input device(s) 614 such as keyboard, mouse, pen, voice input device, touch input device, infrared cameras, video input devices, optical recognition devices, and/or any other input device. Output device(s) 612 such as one or more displays, speakers, printers, and/or any other output device may also be included in device 602. Input device(s) 614 and output device(s) 612 may be connected to device 602 via a wired connection, wireless connection, or any combination thereof. In one embodiment, an input device or an output device from another computing device may be used as input device(s) 614 or output device(s) 612 for computing device 602.

Components of computing device 602 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 602 may be interconnected by a network. For example, memory 608 may be comprised of multiple physical memory units located in different physical locations interconnected by a network.

Those skilled in the art will realize that storage devices utilized to store computer readable instructions may be distributed across a network. For example, a computing device 620 accessible via a network 618 may store computer readable instructions to implement one or more embodiments provided herein. Computing device 602 may access computing device 620 and download a part or all of the computer readable instructions for execution. Alternatively, computing device 602 may download pieces of the computer readable instructions, as needed, or some instructions may be executed at computing device 602 and some at computing device 620.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing linear route conditions, comprising:
    displaying a linear route condition interface comprising a linear route representation of a route from a starting location to a destination location, the linear route representation depicting a first road segment and a second road segment between the starting location and the destination location;
    populating the linear route condition interface with a traffic flow indicator for the first road segment and a second traffic flow indicator for the second road segment;
    responsive to identifying a user indication of interest based upon at least one of a first current user location or a first point of contact corresponding to the first road segment, presenting supplementary information about traffic conditions on the first road segment; and
    responsive to identifying the user indication of interest based upon at least one of a second current user location or a second point of contact corresponding to the second road segment, presenting supplementary information about traffic conditions on the second road segment.

2. The method of claim 1, the displaying a linear route condition interface comprising:
    formatting the linear route representation according to a linear non-map configuration.

3. The method of claim 2, the formatting the linear route representation comprising:
    scaling the linear route representation of the first road segment to correspond to a first distance that the first road segment is traversed along the route; and
    scaling the linear route representation of the second road segment to correspond to a second distance that the second road segment is traversed along the route.

4. The method of claim 1, the populating the linear route condition interface comprising:
    presenting the first road segment in a first color responsive to the first road segment having congestion below a first threshold;
    presenting the first road segment in a second color responsive to the first road segment having congestion between the first threshold and a second threshold; and
    presenting the first road segment in a third color responsive to the first road segment having congestion exceeding the second threshold.

5. The method of claim 1, the populating the linear route condition interface comprising:
presenting the second road segment in a first color responsive to the second road segment having congestion below a first threshold;
presenting the second road segment in a second color responsive to the second road segment having congestion between the first threshold and a second threshold; and
presenting the second road segment in a third color responsive to the second road segment having congestion exceeding the second threshold.

6. The method of claim 1, the first point of contact corresponding to a first touch gesture, the second point of contact corresponding to a second touch gesture.

7. The method of claim 1, comprising:
responsive to the user indication of interest corresponding to the first road segment, expanding a view of the first road segment to an expanded view, the expanded view having an increased level of granularity for the supplemental information.

8. The method of claim 1, the identifying the user indication of interest based upon at least one of the first current user location corresponding to the first road segment or the second current user location corresponding to the second road segment.

9. The method of claim 1, comprising:
responsive to the user indication of interest corresponding to the first road segment:
providing a first vibration frequency based upon congestion of the first road segment; and
responsive to the user indication of interest corresponding to the second road segment:
providing a second vibration frequency based upon congestion of the second road segment.

10. The method of claim 9, the first vibration frequency proportional to the congestion of the first road segment and the second vibration frequency proportional to the congestion of the second road segment.

11. The method of claim 1, the populating the linear route condition interface comprising:
obtaining a current route condition of the route; and
populating the linear route condition interface with an updated first traffic flow indicator and an updated second traffic flow indicator based upon the current route condition.

12. The method of claim 1, the identifying the user indication of interest based upon at least one of the first point of contact corresponding to the first road segment or the second point of contact corresponding to the second road segment.

13. The method of claim 1, comprising:
responsive to identifying a third point of contact on a first point on the linear route condition representation and a fourth point of contact on a second point of the linear route condition representation, at least one of:
generating a travel time between the first point and the second point;
generating a second linear route condition representation, comprising a third traffic flow indicator, corresponding to a route portion between the first point and the second point; or
presenting supplementary information about traffic conditions between the first point and the second point.

14. The method of claim 1, comprising:
responsive to the route having a delay exceeding a delay threshold, populating the linear route condition interface with an alternative linear route representation of an alternative route from a start detour location to the destination location, the alternative linear route depicting a third road segment.

15. The method of claim 1, comprising:
responsive to a selection of a road segment having congestion exceeding a congestion threshold, populating the linear route condition interface with an alternative linear route representation of an alternative route from a start detour location to the destination location, the alternative linear route depicting a third road segment.

16. A non-transitory computer readable medium comprising instructions which when executed perform a method for providing linear route conditions, comprising:
displaying a linear route condition interface comprising a linear route representation of a route from a starting location to a destination location, the linear route representation depicting a first road segment and a second road segment between the starting location and the destination location;
formatting the linear route representation according to a linear non-map configuration;
populating the linear route condition interface with a traffic flow indicator for the first road segment and a second traffic flow indicator for the second road segment;
responsive to identifying a user indication of interest far based upon at least one of a first current user location, a first point of contact, a first voice command, or a first ocular focus corresponding to the first road segment, presenting supplementary information about traffic conditions on the first road segment; and
responsive to identifying the user indication of interest far based upon at least one of a second current user location, a second point of contact, a second voice command, or a second ocular focus corresponding to the second road segment, presenting supplementary information about traffic conditions on the second road segment.

17. The non-transitory computer readable medium method of claim 16, the formatting the linear route representation comprising:
scaling the linear route representation of the first road segment to correspond to a first distance that the first road segment is traversed along the route; and
scaling the linear route representation of the second road segment to correspond to a second distance that the second road segment is traversed along the route.

18. The non-transitory computer readable medium method of claim 16, the populating the linear route condition interface comprising:
presenting the first road segment in a first color responsive to the first road segment having congestion below a first threshold;
presenting the first road segment in a second color responsive to the first road segment having congestion between the first threshold and a second threshold;
presenting the first road segment in a third color responsive to the first road segment having congestion exceeding the second threshold;
presenting the second road segment in the first color responsive to the second road segment having congestion below the first threshold;

presenting the second road segment in the second color responsive to the second road segment having congestion between the first threshold and the second threshold; and presenting the second road segment in the third color responsive to the second road segment having congestion exceeding the second threshold.

19. The non-transitory computer readable medium method of claim 16, the supplementary information comprising at least one of:
a street name, a duration of a delay, a cause of delay, a volume of truck traffic, a travel time for the route, a travel time, a business, an event, a point of interest, a speed limit, a number of incidents, or a volume of vehicles.

20. A client device for providing linear route conditions, the client device comprising:
a processor;
a display; and
a memory storing instructions that, when executed on the processor, provide a system comprising:
a linear route condition component configured to:
display a linear route condition interface comprising a linear route representation of a route from a starting location to a destination location, the linear route representation depicting a first road segment and a second road segment between the starting location and the destination location;
format the linear route representation according to a linear non-map configuration, comprising:
scaling the linear route representation of the first road segment to correspond to a first distance that the first road segment is traversed along the route; and
scaling the linear route representation of the second road segment to correspond to a second distance that the second road segment is traversed along the route;
populate the linear route condition interface with a traffic flow indicator for the first road segment and a second traffic flow indicator for the second road segment;
responsive to identifying a user indication of interest based upon at least one of a first current user location, a first point of contact, a first voice command, or a first ocular focus corresponding to the first road segment, present supplementary information about traffic conditions on the first road segment; and
responsive to identifying the user indication of interest based upon at least one of a second current user location, a second point of contact, a second voice command, or a second ocular focus corresponding to the second road segment, present supplementary information about traffic conditions on the second road segment.

* * * * *